US 8,589,884 B2

(12) United States Patent
Gorthi et al.

(10) Patent No.: US 8,589,884 B2
(45) Date of Patent: Nov. 19, 2013

(54) METHOD AND SYSTEM FOR IDENTIFYING REGRESSION TEST CASES FOR A SOFTWARE

(75) Inventors: Ravi Prakash Gorthi, Bangalore (IN); Kailash Kumar Prasad Chanduka, Bangalore (IN); Benny Leong, Lafayette, IN (US); Anjaneyulu Pasala, Bangalore (IN)

(73) Assignee: Infosys Limited (IN)

( * ) Notice: Subject to any disclaimer, the term of this patent is extended or adjusted under 35 U.S.C. 154(b) by 480 days.

(21) Appl. No.: 12/891,046

(22) Filed: Sep. 27, 2010

(65) Prior Publication Data

US 2011/0016452 A1    Jan. 20, 2011

Related U.S. Application Data

(63) Continuation-in-part of application No. 12/321,133, filed on Jan. 15, 2009, now Pat. No. 8,161,459.

(51) Int. Cl.
G06F 9/44    (2006.01)

(52) U.S. Cl.
USPC ........... 717/124; 717/120; 717/144; 717/159; 714/38.1

(58) Field of Classification Search
None
See application file for complete search history.

(56) References Cited

U.S. PATENT DOCUMENTS

| | | | |
|---|---|---|---|
| 6,343,376 B1 * | 1/2002 | Saxe et al. | 717/154 |
| 6,370,681 B1 * | 4/2002 | Dellarocas et al. | 717/110 |
| 6,701,514 B1 * | 3/2004 | Haswell et al. | 717/115 |
| 7,017,146 B2 * | 3/2006 | Dellarocas et al. | 717/106 |
| 7,392,507 B2 * | 6/2008 | Kolawa et al. | 717/124 |
| 7,788,636 B2 * | 8/2010 | Nakamura et al. | 717/104 |
| 7,958,400 B2 * | 6/2011 | Ur | 717/126 |
| 8,276,123 B1 * | 9/2012 | Deng et al. | 717/125 |
| 2002/0095660 A1 | 7/2002 | O'Brien et al. | |
| 2004/0030421 A1 | 2/2004 | Haley | |
| 2004/0268308 A1 | 12/2004 | Srivastava et al. | |
| 2005/0120276 A1 * | 6/2005 | Kolawa et al. | 714/38 |
| 2005/0216555 A1 | 9/2005 | English et al. | |
| 2005/0229043 A1 | 10/2005 | Nasuti et al. | |
| 2006/0075303 A1 | 4/2006 | Ulrich et al. | |
| 2006/0212540 A1 | 9/2006 | Chon et al. | |
| 2006/0253839 A1 | 11/2006 | Avritzer et al. | |
| 2007/0005786 A1 * | 1/2007 | Kumar et al. | 709/230 |
| 2007/0087756 A1 * | 4/2007 | Hoffberg | 455/450 |
| 2007/0220342 A1 | 9/2007 | Vieira et al. | |
| 2008/0256393 A1 * | 10/2008 | Ur | 714/38 |
| 2010/0083240 A1 * | 4/2010 | Siman | 717/144 |

OTHER PUBLICATIONS

Title: A framework and tool support for the systematic testing of model-based specifications, author: Miller et al, dated: Oct. 2003, source: ACM.*
Title: Regression Testing for Component-based Software Systems by Enhancing Change Information, author: Chengying Mao et al, source: IEEE, dated: 2005.*

* cited by examiner

*Primary Examiner* — Chameli Das
(74) *Attorney, Agent, or Firm* — Lerner, David, Littenberg, Krumholz & Mentlik, LLP

(57) ABSTRACT

The present invention provides a method, system and computer program product for identifying regression test cases for a software application by identifying one or more units of functionalities of the software application, structuring the use case activity diagrams using the identified units of functionalities, modifying the structured use case activity diagrams when there is a change in the software application, and analyzing the modifications made to the structured use case activity diagrams to identify regression test cases for the changes in the software application.

19 Claims, 4 Drawing Sheets

METHOD AND SYSTEM FOR IDENTIFYING REGRESSION TEST CASES FOR A SOFTWARE

This application is a continuation-in-part of U.S. application Ser. No. 12/321,133, filed on Jan. 15, 2009, the disclosure of which is incorporated herein by reference.

FIELD OF INVENTION

The instant invention relates to a method and system for identifying regression test cases for testing a software application using use case activity diagrams of the software application.

BACKGROUND OF THE INVENTION

Software developers periodically release upgrades to their application software due to bug fixes and enhancements. By regression testing, the software developers ensure that changes made to existing software behave as desired and unchanged parts of software is not adversely affected.

Current practice of executing entire system test suite developed during software system testing to validate modified software applications is expensive and time consuming. Thus, the importance of smaller regression tests suite selection techniques. Several regression test selection techniques comprising of code-based, model-based and architecture-based have been proposed in the literature. Largely the model-based regression test suite selection techniques are based on design models. Often, for a large and complex system comprising of thousands of test cases, the developers intuitively select regression tests, based on their experience and knowledge on program change specifications that need to be re-executed. This practice is prone to errors.

The drawbacks of current regression tests selection strategies are that the techniques are based on either applications or components source code availability or changes made available in UML design diagrams such as sequence diagrams, state diagrams, and collaboration diagrams. The algorithms select the test cases from the available system test suite but cannot generate additional test cases to be added to the original system test suite.

A methodology is required which is independent of the program language used to implement the software applications.

BRIEF SUMMARY OF THE INVENTION

It is an objective of the present invention to provide a method and system for identifying regression test cases for a software application using use case activity diagrams of the software application.

To achieve the aforementioned objective the instant invention provides a method for identifying regression test cases for a software application using use case activity diagrams of the software application, the use case activity diagrams having nodes and paths, the method comprising identifying one or more units of functionalities of the software application; structuring the use case activity diagrams using the identified units of functionalities; modifying the structured use case activity diagrams when there is a change in the software application; and analyzing the modifications made to the structured use case activity diagrams to identify regression test cases for the changes in the software application.

The instant invention also provides a system for identifying regression test cases for a software application using use case activity diagrams of the software application, the use case activity diagrams having nodes and paths, the system comprising identifying module for identifying one or more units of functionalities of the software application; structuring module for structuring the use case activity diagrams using the identified units of functionalities; modifying module for modifying the structured use case activity diagrams when there is a change in the software application; and analyzing module for analyzing the modifications made to the structured use case activity diagrams to identify regression test cases for the changes in the software application.

The instant invention also provides a computer program product for identifying regression test cases for a software application using use case activity diagrams of the software application, the use case activity diagrams having nodes and paths, the computer program product consisting of a plurality of instructions stored on tangible computer readable media which when run upon a computer processor carries out steps for managing resources, comprising instructions for, identifying one or more units of functionalities of the software application; structuring the use case activity diagrams using the identified units of functionalities; modifying the structured use case activity diagrams when there is a change in the software application; and analyzing the modifications made to the structured use case activity diagrams to identify regression test cases for the changes in the software application.

These and other features, aspects, and advantages of the present invention will become better understood with reference to the following description and claims.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

Figure 1:
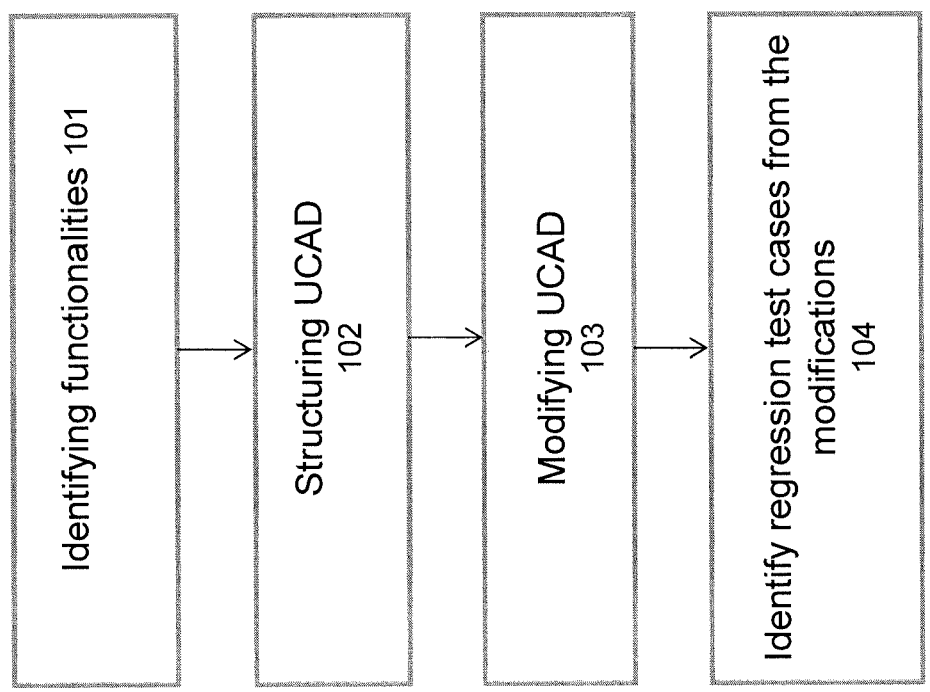
FIG. 1 illustrates a flowchart for identifying regression test cases.

The instant invention uses the concept of structuring the use cases activity diagram (UCAD) using unit of functionalities of the software application. The requirements of the software application are analyzed to identify the functionalities performed by the software application. Such functionalities are further sliced down to a basic unit in the form of a tuple <UI, SP, C, SO>, where UI: user input
SP: system process/set of instructions
C: conditions
SO: system output FIG. 1 describes the basic steps for the method (10) of identifying regression tests for a software application. Initially the use case functionalities performed by the software application are identified (101) from the given software requirements. For eg, in a process relating to PIN validation for ATM system, one of the units of functionalities would be 'entering the PIN', which can be represented as a tuple as:

UI: swipe card
SP: card validation

C: if card is valid
SO: display message 'enter PIN'

Similarly such units of functionalities of the software application are identified. In an embodiment, this analysis and identification is done manually. In step 102, the UCADs are structured using the units of functionalities of the software application identified in step 101. UCADs are typically used to model the system behavior contained in a single use case or user scenario. These activity diagrams are generally unstructured. Therefore, the UCADs are structured so that all types of test cases are easily identified and generated.

Further, in the event of a change in the requirements of the software application, the corresponding UCADs are modified to reflect the changed specifications (103). The changes could be at either path or node levels. There could be a few nodes that have been added newly or changed or deleted to reflect the changes in the requirements. Such modifications made in the UCAD are analysed (104). The previously generated UCADs and the modified UCADs are compared and analysed. These changes are classified as (1) Modification to an existing node, (2) Addition of a new node, (3) Deletion of an existing node, and (4) Shifting of an existing node. The paths in the activity diagram that have one or more of these changed nodes are called as affected paths.

The behavior corresponding to the affected paths need to be re-validated as they are the potential problem areas. There are two types of paths: (1) the paths that have been affected due to changes to the specifications, and (2) the paths that have been added newly due to addition of new requirements in the specifications. In the first case, the test cases that traverse the affected paths are already existing and recommended for regression testing to validate the changed part of the specifications. In case of newly added paths, a new set of test cases are generated which validate the newly added behavior of the software. Both sets of test cases together constitute the regression test suite. Also, the paths having very critical nodes are recommended for regression testing.

Figure 2:
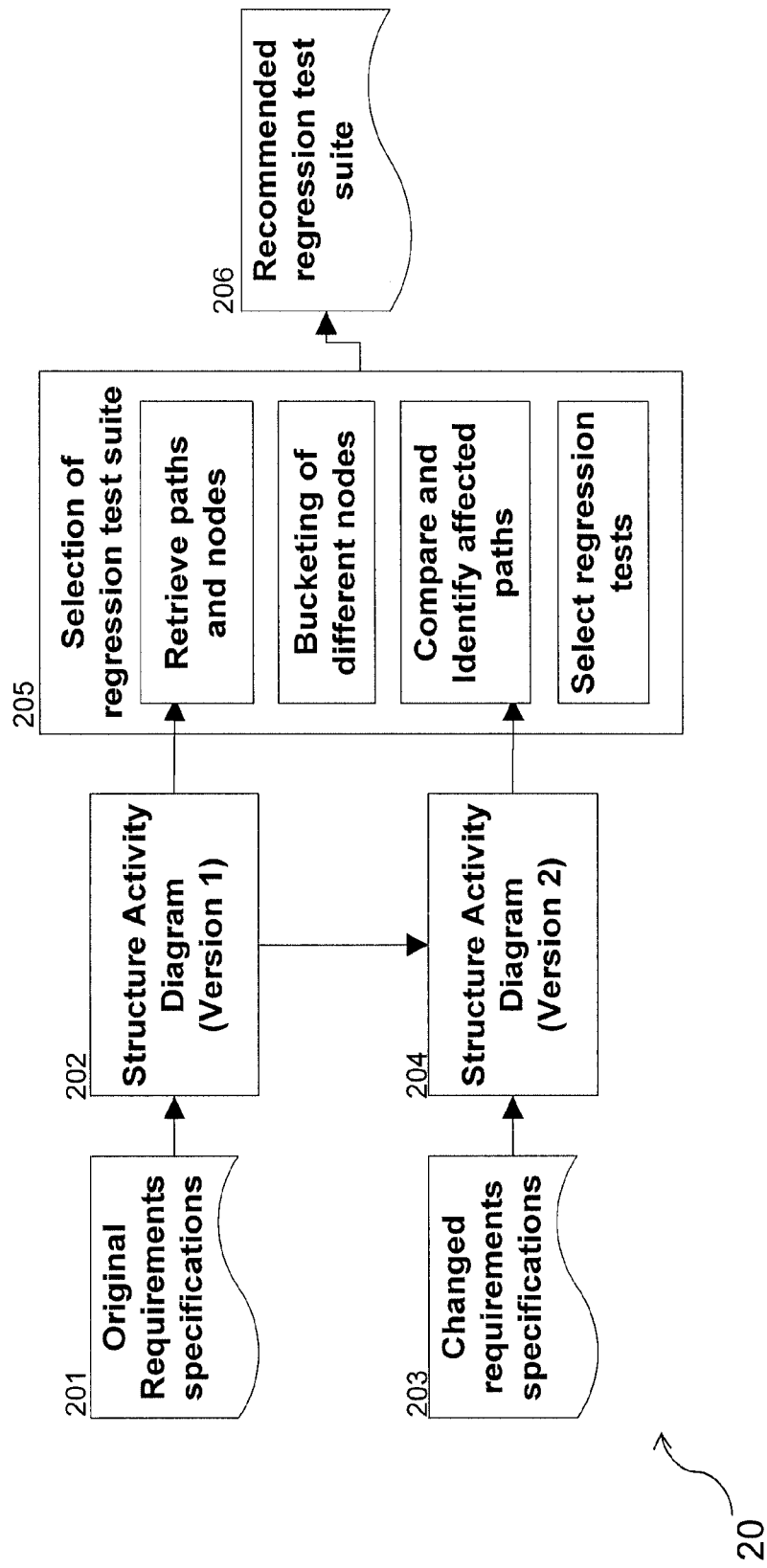
FIG. 2 is a flowchart for a preferred embodiment of a method for identifying regression test cases.

FIG. 2 describes a preferred embodiment of the instant invention. In step 201, the requirements of the software application are collected. These are the original requirements of the application. In step 202, the UCADs relating to the above requirements are structured. In an embodiment, the units of functionalities are used to structure the UCADs. In the event of a change in the requirements (203), new UCADs are created by appropriately modifying the earlier UCADs (204). These new UCADs represent the changes in the requirements.

Step 205 describes the details of selecting a regression test suite for a changed software application. Each time a change is made to the activity diagram as a result of a change in requirements, we need to identify the nodes that are being changed, the affected paths and the affected units of behavior in each affected path. On identifying the affected paths, the test cases should be generated for each affected path for the purpose of regression testing. The UCADs from original specification of the software application and the new UCADs formed after the changes in the requirements are compared. There needs to be new test cases for the changed specifications.

Figure 3:
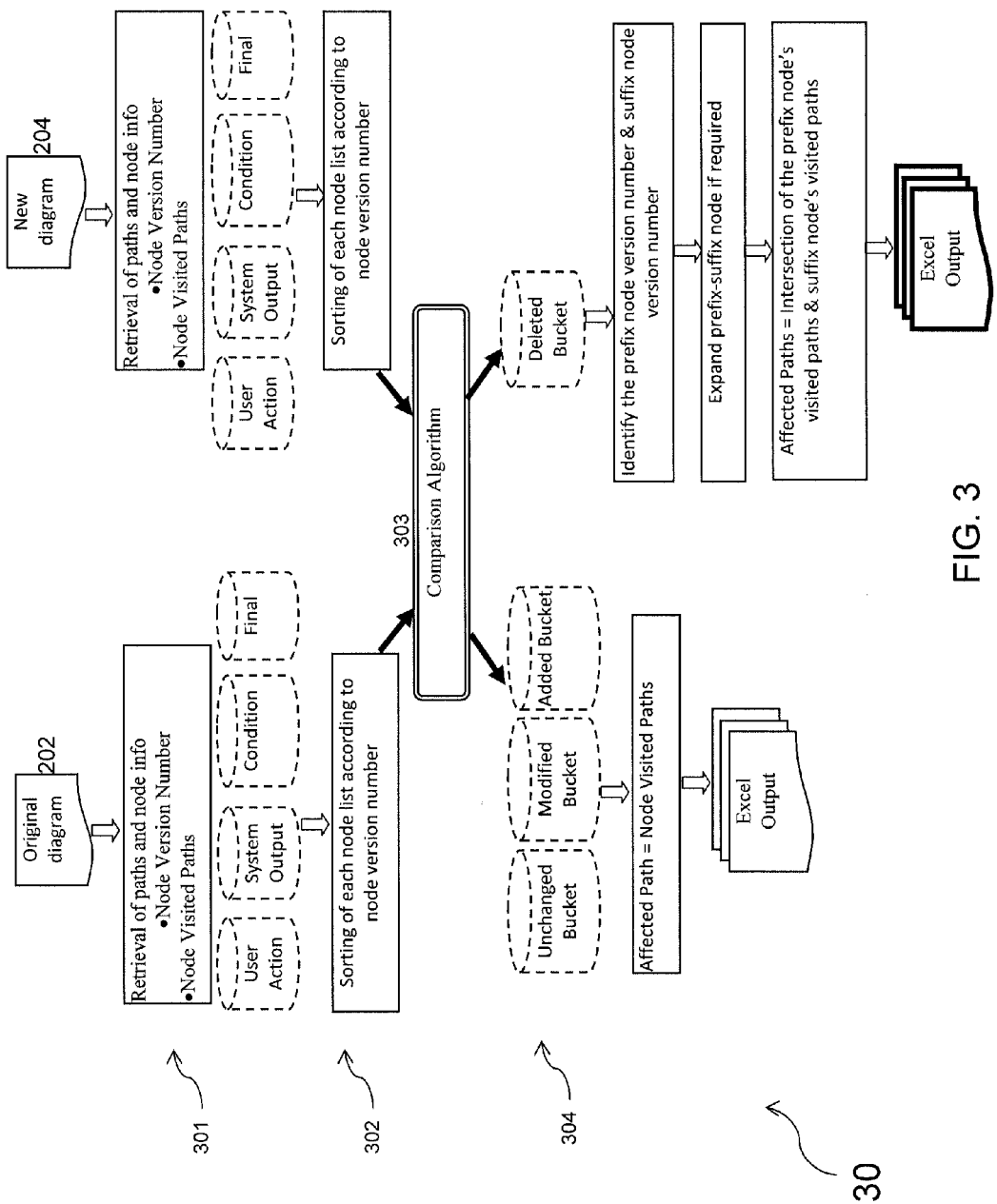
FIG. 3 describes the process for finding changes made to the UCAD.

There are two types of paths in a UCAD: (1) the paths that have been affected due to changes to the specifications, and (2) the paths that have been added newly due to addition of new specifications. The nodes in the UCADs are bucketed in different categories depending on whether it's a modification of an existing node, addition of a new node, deletion of an existing node, or shifting of a node (Deletion followed by Addition). The selection of test cases based on the comparison, and the bucketing of nodes, has been described in FIG. 3.

In an embodiment of the present invention, the nodes of the UCADs have a unique identifier. Every node in the activity diagram structured using 'unit of behavior' technique is allotted an identifier. The node version number actually contains three kinds of information. The structure of the node version number is: AA: <N.M>. The two characters AA before the colon indicate the type of the node. N indicates the sequence of that node in its type. M following the period is the indicator of the version of the node. For instance, UA: <1.0> wherein,
UA: user action node
<1.0>: first user action node Similarly UA: <4.0>, is the fourth user action node. This number is modified whenever the description of the node is updated. SO: <1.2> is the second version of SO: <1.0> i.e. the description of the node SO: <1.0> must have been modified twice.

In an embodiment, the criticality of nodes is also represented by the identifier. Some requirements of a system are considered more important than other parts of the system. For instance, the correct verification of PIN number as well as the account balance is more important than the correct display of the welcome message in the ATM system. Thus, the tester has to pay more attention to those aspects of the system with higher importance during testing. Therefore, in order to reflect criticality in the activity diagram, the following notation in the description of the nodes is followed:
[H] Node with high criticality
[M] Node with medium criticality
[L] Node with low criticality FIG. 3 describes the algorithm for bucketing the nodes as per the change in the UCAD. It provides a solution that is able to efficiently identify all the changes based on two versions of activity diagram. The comparison algorithm is able to identify all the changes by doing at most n-comparisons.

In one embodiment, UCAD developed by UML tools—come in XMI format. Thus the invention provides an XML schema for the activity diagram and develops a tool that converts the activity diagram from XMI to XML. Any activity diagram that follows the defined XML schema will be a valid input to the framework that has been developed. Once a valid input, an activity diagram that adheres to defined XML schema, is passed to the tool, the nodes information is retrieved from the XML file.

In step 301 in method 30, the original UCAD (202) and new UCAD (204) are analysed. The node information is retrieved in both the versions of UCADs (301). In an embodiment, the node information is retrieved using the node identifiers.

Let $FN_{new}$=first node version number from the new list;
Let $FN_{ori}$=first node version number from the original list;
Let $LN_{ori}$=last node version number from the original list.

The nodes of the UCADs are identified and sorted in step 302. The nodes are then compared in step 303. For comparison $LN_{ori}$, $FN_{ori}$, $FN_{new}$, are compared. The node sequence and the node version number extracted from the identifier are compared, which tells whether the node has been modified or not. In case the version numbers are equal, the node is categorized as unchanged (304).

If the version number is changed, the node is moved to the modified bucket. The remaining nodes in the new list are moved to added bucket and the remaining nodes in the original list are moved to the deleted bucket in step 304. Similarly for every sequence number, the node version number of each node is compared and analysed and thus the nodes are categorized.

After placing all the nodes in different buckets based on the changes, the algorithm identifies the paths in the new activity diagram that are affected by the changes. A path is said to be affected if it contains one or more of the modified or added or deleted nodes.

The affected paths and unchanged paths are identified. The behavior that is part of the affected paths has been changed. Therefore, this behavior has to be re-validated. To validate the affected behavior of the system, the test cases that belong to affected paths are the ones that need to be re-executed. All affected paths appear in the order of criticality: paths with high criticality will appear first followed by paths with medium criticality and low criticality. Further, if an unchanged path has one or more 'high' criticality nodes, then that path is also validated, and the test cases relating to it are re-executed.

Figure 4:
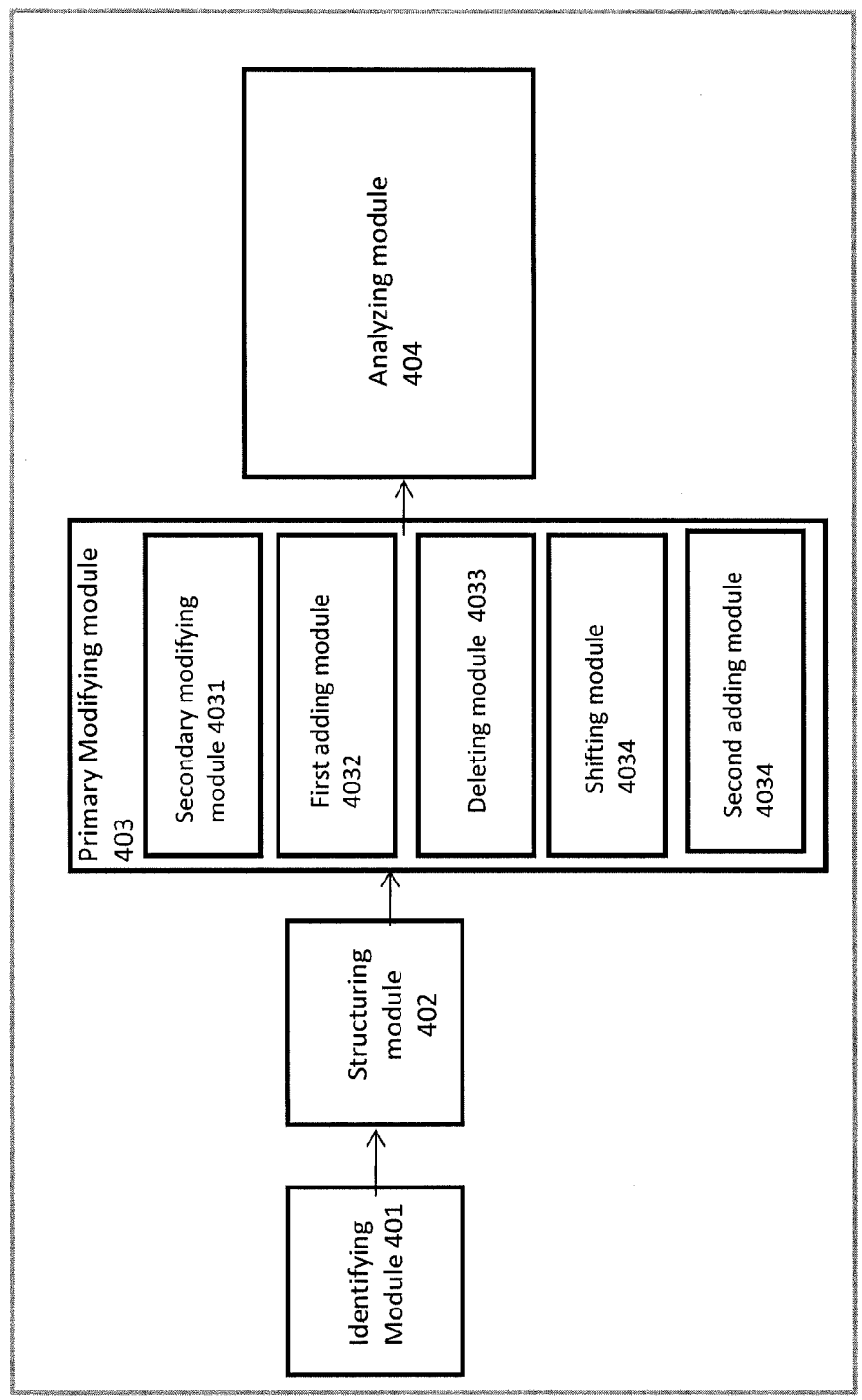
FIG. 4 shows a system for identifying regression test cases, in accordance with an embodiment of the present invention.

FIG. 4 describes a system (40) for identifying regression tests according to a preferred embodiment of the present invention. The present system identifies regression test cases from the UCADs of the software application.

In an embodiment, the system has an identifying module (401) which analyses the software application requirements and identifies the functionalities performed by the application. The units of such functionalities are identified by the identifying module. These identified units of functionalities are then used to structure the UCADs of the software application by the structuring module (402) of the system.

Whenever there is a change in the requirements of the software application, a primary modifying module (403) in the system modifies the UCADs accordingly, to reflect the changes in the UCADs. An analyzing module (404) in the system analyses the changes made to the UCADs and identifies regression tests for the changes in the software requirements.

In a preferred embodiment, the units of functionalities identified by the identifying module are in the form of a tuple which comprises of a user input, a set of instructions to process the input, a set of conditions and a system output. <UI, SP, C, SO>.

In another embodiment, each of the nodes in the UCAD has an identifier. The identifier has an indicator to the sequence number and version number of the node which indicates any change to the node. There is also an indicator for telling the criticality of the nodes.

In a further embodiment, the primary modifying module has a changing module for changing the nodes of the UCADs. The changing module further has a secondary modifying module (4031) for modifying the nodes, a first adding module (4032) for adding a node to the UCAD. A second adding module (4034) in the changing module is provided for adding a new path to the UCAD if required as per the changes in the requirements of the software. A deleting module (4033) in the modifying module deletes nodes from the UCADs and a shifting module shifts nodes in the UCAD.

Based on whether a node has been changed i.e. added, modified, deleted or shifted, or if a path has been added to the UCAD according to the changes in the software requirement, or if the path has a 'high' criticality node, the analyzing module (404) identifies regression tests for those changes in the software.

The analysis module extracts node information from the UCAD for identifying the modifications made to the node. The UCAD developed by UML tools come in XMI format. Thus, in one embodiment, the invention provides an XML schema for the activity diagram and develops a tool that converts the activity diagram from XMI to XML. Any activity diagram that follows the defined XML schema will be a valid input to the framework that we have developed. Once a valid input, an activity diagram that adheres to defined XML schema, is passed to the tool, the nodes information is retrieved from the XML file.

The system for identifying regression test cases for testing a changed software application, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for developing one or more test cases for testing a software application. The computer program product includes a computer usable medium having a set of program instructions comprising a program code for generating test cases for testing a software application. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A computer implemented method for identifying regression test cases for a software application using use case activity diagrams of the software application, the use case activity diagrams having nodes and paths, the method comprising:
   identifying, using a computer, one or more units of functionalities of the software application, wherein the one or more units of functionalities are identified by slicing the functionalities of the software application to an indivisible level, further wherein each unit of the one or more units comprises an ordered sequence of a user input, a set of instructions to process the input, a set of conditions and a system output;
   structuring, using the computer, the use case activity diagrams using the identified units of functionalities;
   modifying, using the computer, the structured use case activity diagrams when there is a change in the software application; and
   comparing, using the computer, the nodes of the structured use case activity diagrams and the modified use case activity diagrams;
   categorizing, using the computer, the nodes based on the comparison of the nodes, wherein the nodes are categorized into at least one of categories: modification to an existing node, addition of a new node, deletion of an existing node, and shifting of an existing node;
   identifying, using the computer, regression test cases based on affected paths in the modified use case activity diagrams, wherein a path in the modified use case activity diagram is considered to be affected if it contains at least one of: a modified node, an added node, a deleted node, and a shifted node.

2. The computer implemented method of claim 1, wherein modifying the structured use case activity diagrams comprises making a change to the nodes of the use case activity diagrams, and wherein the change to the nodes comprises at least one of: modifying an existing node of the structured use case activity diagram; adding a new node to the structured use case activity diagram; deleting an existing node of the structured use case activity diagram; and shifting an existing node of the structured use case activity diagram.

3. The computer implemented method of claim 1, wherein modifying the structured use case activity diagrams further comprises adding a new path to the structured use case activity diagram.

4. The computer implemented method of claim 3, wherein identifying regression test cases further comprises:
   identifying the new paths added to the use case activity diagrams; and generating new test cases for the identified paths.

5. The computer implemented method of claim 1, wherein each of the nodes in the use case activity diagrams has an identifier comprising: a first indicator for indicating a change to the node, wherein the first indicator has a predefined value in case of a change to the node; and a second indicator for indicating a criticality of the node, the criticality being one of high, medium and low.

6. The computer implemented method of claim 5, wherein identifying regression test cases comprises:
   identifying paths of the use case activity diagrams having a node with the first indicator having the predefined value;
   identifying paths of the use case activity diagrams having a node with the second indicator indicating a high criticality;
   and identifying test cases validating the identified paths.

7. The computer implemented method of claim 1, wherein the comparison of the nodes is based on retrieved information of the nodes of the structured use case activity diagrams and the modified use case activity diagrams, further wherein the information of the nodes is retrieved from identifiers associated with the nodes, further wherein the information provided by each identifier comprises type of node, sequence of the node, version of the node, and criticality of the node.

8. A system for identifying regression test cases for a software application using use case activity diagrams of the software application, the use case activity diagrams having nodes and paths, the system comprising a microprocessor and a memory, the system further comprising:
   an identifying module, using the microprocessor, for identifying one or more units of functionalities of the software application, wherein the one or more units of functionalities are identified by slicing the functionalities of the software application to an indivisible level, further wherein each unit of the one or more units comprises an ordered sequence of a user input, a set of instructions to process the input, a set of conditions and a system output;
   a structuring module, using the microprocessor, for structuring the use case activity diagrams using the identified units of functionalities;
   a modifying module, using the microprocessor, for modifying the structured use case activity diagrams when there is a change in the software application; and
   an analyzing module, using the microprocessor, for:
      comparing, using the computer, the nodes of the structured use case activity diagrams and the modified use case activity diagrams;
      categorizing, using the computer, the nodes based on the comparison of the nodes, wherein the nodes are categorized into at least one of categories: modification to an existing node, addition of a new node, deletion of an existing node, and shifting of an existing node;
      identifying regression test cases based on affected paths in the modified use case activity diagrams, wherein a path in the modified use case activity diagram is considered to be affected if it contains at least one of: a modified node, an added node, a deleted node, and a shifted node.

9. The system of claim 8, wherein the modifying module comprises a changing module for making a change to the nodes of the use case activity diagrams, the changing module comprising at least one of: a first modifying module for modifying an existing node of the structured use case activity diagram; a first adding module for adding a new node to the structured use case activity diagram; deleting module for deleting an existing node of the structured use case activity diagram; and shifting module for shifting an existing node of the structured use case activity diagram.

10. The system of claim 8, wherein the modifying module further comprises a second adding module for adding a new path to the structured use case activity diagram.

11. The system of claim 10, wherein the analyzing module further comprises: a third identifying module for identifying the new paths added to the use case activity diagrams; and generating module for generating new test cases for the identified paths.

12. The system of claim 8, wherein each of the nodes in the use case activity diagrams has an identifier comprising:
   a first indicator for indicating a change to the node, wherein the first indicator has a predefined value in case of a change to the node; and a second indicator for indicating a criticality of the node, the criticality being one of high, medium and low.

13. The system of claim 12, wherein the analyzing module comprises an identifying module for:
   identifying paths of the use case activity diagrams having a node with the first indicator having the predefined value;
   identifying paths of the use case activity diagrams having a node with the second indicator indicating a high criticality;
   and identifying test cases validating the identified paths.

14. A computer program product for identifying regression test cases for a software application using use case activity diagrams of the software application, the use case activity diagrams having nodes and paths, the computer program product consisting of a plurality of instructions stored on tangible, non transitory computer readable media which when run upon a computer processor carries out steps for identifying regression test cases, comprising instructions for:
   identifying one or more units of functionalities of the software application, wherein the one or more units of functionalities are identified by slicing the functionalities of the software application to an indivisible level, further wherein each unit of the one or more units comprises an ordered sequence of a user input, a set of instructions to process the input, a set of conditions and a system output;
   structuring the use case activity diagrams using the identified units of functionalities;
   modifying the structured use case activity diagrams when there is a change in the software application; and
   comparing the nodes of the structured use case activity diagrams and the modified use case activity;
   categorizing the nodes based on the comparison of the nodes, wherein the nodes are categorized into at least one of categories: modification to an existing node, addition of a new node, deletion of an existing node, and shifting of an existing node;
   identifying regression test cases based on affected paths in the modified use case activity diagrams, wherein a path in the modified use case activity diagram is considered to be affected if it contains at least one of: a modified node, an added node, a deleted node, and a shifted node.

15. The computer program product of claim 14, wherein the instructions for modifying comprises instructions for making a change to the nodes of the use case activity diagrams, the instructions for making changes further comprising instructions for: modifying an existing node of the structured use case activity diagram; adding a new node to the structured use case activity diagram; deleting an existing node of the structured use case activity diagram; and shifting an existing node of the structured use case activity diagram.

16. The computer program product of claim 14, wherein the instructions for modifying further comprises instructions for adding a new path to the structured use case activity diagram.

17. The computer program product of claim 16, wherein instructions for analyzing the modifications further comprises instructions for: identifying the new paths added to the use case activity diagrams; and generating new test cases for the identified paths.

18. The computer program product of claim 14, wherein each of the node in the use case activity diagram has an identifier comprising: a first indicator for indicating a change to the node, wherein the first indicator has a predefined value in case of a change to the node; and a second indicator for indicating a criticality of the node, the criticality being one of high, medium and low.

19. The computer program product of claim 18, wherein the instructions for analyzing further comprises instructions for: identifying paths of the use case activity diagrams having a node with the first indicator having the predefined value;
   identifying paths of the use case activity diagrams having a node with the second indicator indicating a high criticality;
   and identifying test cases validating the identified paths.

\* \* \* \* \*